(12) United States Patent
Azpiroz et al.

(10) Patent No.: US 10,722,887 B2
(45) Date of Patent: Jul. 28, 2020

(54) DEVICE AND METHOD FOR FLOW AND BEAD SPEED CHARACTERIZATION IN MICROFLUIDIC DEVICES

(71) Applicant: International Business Machines Corporation, Armonk, NY (US)

(72) Inventors: Jaione Tirapu Azpiroz, Rio de Janeiro (BR); Emmanuel Delamarche, Thalwil (CH); Yuksel Temiz, Zug (CH)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/464,841

(22) Filed: Mar. 21, 2017

(65) Prior Publication Data

US 2018/0272348 A1    Sep. 27, 2018

(51) Int. Cl.
*B01L 3/00* (2006.01)
*G01F 1/704* (2006.01)
*G01N 15/10* (2006.01)

(52) U.S. Cl.
CPC ..... *B01L 3/502761* (2013.01); *B01L 3/50273* (2013.01); *B01L 3/502715* (2013.01); *G01F 1/7046* (2013.01); *B01L 3/5027* (2013.01); *B01L 2200/0647* (2013.01); *B01L 2200/0652* (2013.01); *B01L 2200/0668* (2013.01); *B01L 2400/0424* (2013.01); *G01N 2015/1075* (2013.01); *G01N 2015/1081* (2013.01)

(58) Field of Classification Search
CPC ......... B01L 3/502761; B01L 3/502715; B01L 3/50273; B01L 2200/0647; B01L 2200/0652; B01L 2200/0668; B01L 2400/0424; B01L 3/5027; G01F 1/7046; G01N 15/1484; G01N 15/1075; G01N 15/1081; G01N 27/44791; G01N 2015/1075; G01N 2015/1081
See application file for complete search history.

(56) References Cited

U.S. PATENT DOCUMENTS 6,641,708 B1 * 11/2003 Becker ............... B03C 5/026
204/547
2008/0302732 A1 * 12/2008 Soh ................ B01L 3/502761
210/695
(Continued)

*Primary Examiner* — Maris R Kessel
*Assistant Examiner* — Vivian A Tran
(74) *Attorney, Agent, or Firm* — Harrington & Smith

(57) ABSTRACT

Method, apparatus, and computer program product for a microfluidic channel having a cover opposite its bottom, the cover allowing visual inspection inside the channel, and having electrodes with patterned planar conducting materials, integrated onto its bottom. Using the planar conducting materials, once a fluid sample with suspended microparticles is applied into the channel, highly localized modulated electric field distributions are generated inside the channel and the fluid sample. This generated field causes inducing of dielectrophoretic (DEP) forces such that the DEP forces gradually increase along the length of the channel occupied by the electrodes. These DEP forces counteract the hydrodynamic drag of the flow acting on the particles suspended in the fluid. Because of the induced forces, micro/nanoparticles in the fluid sample are deflected at locations in the microchannel that are a function of the particles velocity and this effect is captured by an image sensing device.

12 Claims, 12 Drawing Sheets

(56) References Cited

U.S. PATENT DOCUMENTS

| | | | |
|---|---|---|---|
| 2010/0310421 A1* | 12/2010 | Oliver | G01N 33/48721 |
| | | | 422/82.01 |
| 2011/0196637 A1* | 8/2011 | Sharpe | G01N 15/1012 |
| | | | 702/104 |
| 2011/0284378 A1* | 11/2011 | Shinoda | B01L 3/0268 |
| | | | 204/603 |
| 2012/0237997 A1* | 9/2012 | Koser | B03C 1/253 |
| | | | 435/173.9 |
| 2016/0003771 A1* | 1/2016 | Trau | G01N 27/3276 |
| | | | 204/450 |
| 2017/0102016 A1* | 4/2017 | Azpiroz | B01L 3/5027 |
| 2018/0266937 A1* | 9/2018 | de Wagenaar | G01N 15/1031 |

\* cited by examiner

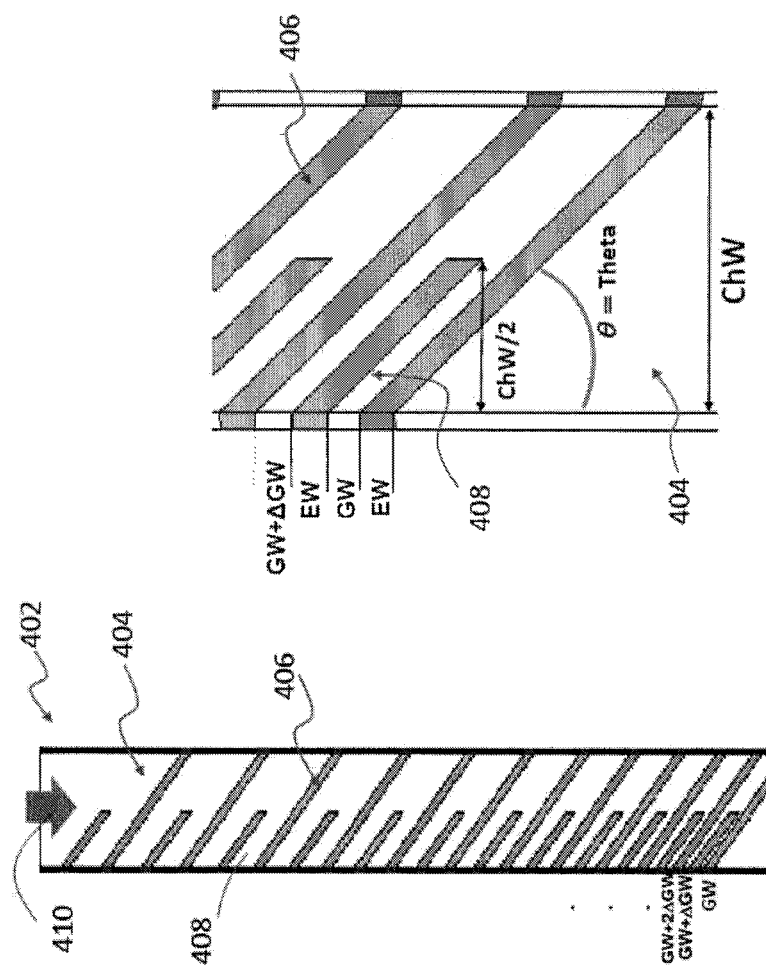

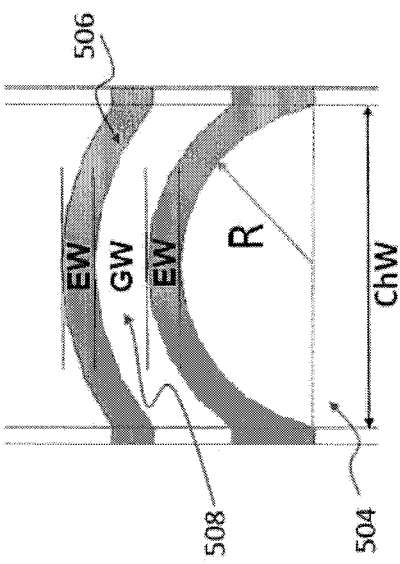
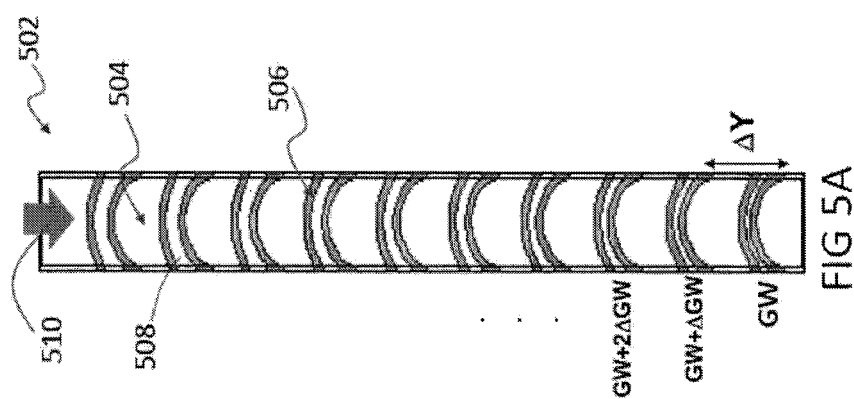
FIG 5A  FIG 5B  FIG 5C

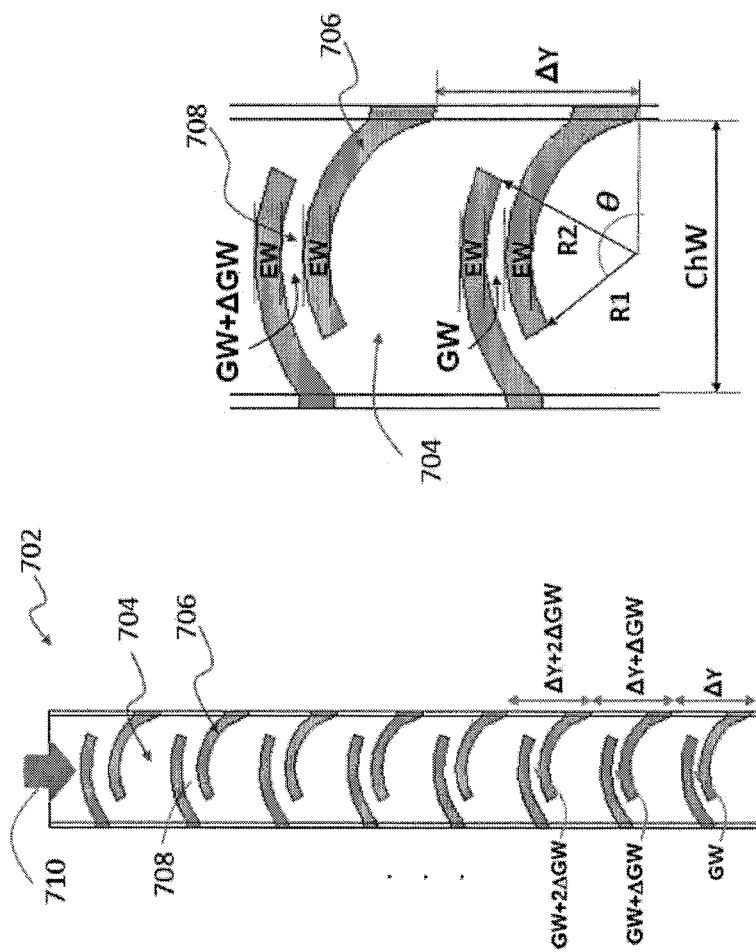

DEVICE AND METHOD FOR FLOW AND BEAD SPEED CHARACTERIZATION IN MICROFLUIDIC DEVICES

TECHNICAL FIELD

This invention relates generally to microfluidic devices wherein particles can be manipulated or trapped using planar conducting materials.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

Microfluidic-based devices offer benefits as they are in effect miniaturized laboratories with advantages of low-energy, small sample, and bio-receptor volume consumption; high integration, multiplexing, and compactness; fast results; and low cost. Moreover, such devices have the potential for applications as research platforms as well as point-of-care devices.

Microfluidics facilitate touchless manipulation of single cells, organisms, or particles through the exploitation of the "dielectrophoretic" effect. A dielectrophoretic (DEP) force arises from the polarization of otherwise electrically neutral particles or cells when suspended in a non-homogeneous electric field. This requires creating an electric field gradient within the sample fluid, often done with an arrangement of planar metallic electrodes integrated in the microfluidic channel in contact with the fluid.

This polarization occurs due to the imbalanced distribution of bonded charges induced by the electric field and acts to attract/repel cells to/from electric field maxima for positive/negative dielectrophoretic force, as described in the following equation:

$$F_{DEP}(r;V) = 2\pi\varepsilon_m R^3 \, \text{Re}[CM] \nabla |E(r;V)|^2 \qquad (1),$$

where:
  R=radius (particle size);
  CM=$(\varepsilon^*_p - \varepsilon^*_m)/(\varepsilon^*_p + 2\varepsilon^*_m)$=Claussius-Mossotti Factor (complex coefficient arising from the relation between the complex electrical properties of the particle, $\varepsilon^*_p$, and the suspending medium, $\varepsilon^*_m$); and
  $|E(r;V)|^2$=spatial distribution and excitation configuration of the electric field intensity as a function of the electrode design as well as the applied voltage V.

The complex permittivity (an electrical or material property) of either the medium, $\varepsilon^*_m$, or the particle, $\varepsilon^*_p$, is given by $\varepsilon^* = \varepsilon - j\sigma/\omega$, with $\varepsilon = \varepsilon_0 \varepsilon_r$ being the absolute permittivity of the material, $\varepsilon_r$ being the relative permittivity, $\varepsilon_0$ the free space permittivity, $\sigma$ the conductivity, and $\omega$ the angular frequency. The imaginary unit j is defined as $j^2 = -1$. These forces depend not only on the geometrical configuration and excitation scheme of the electric field but also on the electrical properties of the cell or particle and of its suspending medium as well as its size; hence, can be used for particle discrimination, separation, isolation, or concentration, being useful for sample processing.

Integrated electrodes in microfluidic channels can be used with other purposes in addition to generating DEP forces (both positive and negative) such as electrical sensing (impedance, capacitance, etc.), optical illumination and detection, heating mechanism to induce reactions, etc.

Microfluidic devices often require transporting fluids through the micro-channels, usually done by coupling to external pumping peripherals with fluid tubes and connectors. Such flow-based microfluidic devices can be made more portable and autonomous by integrating a capillary pump onto the device substrate capable of sustaining a flow rate in the channel Such capillary pump refers to a widening structure within the micro channel filled with an array of pillars capable of pulling fluid along the channel by means of capillary pressure. The flow rate and volume of fluid this structure can remove depends strongly on its geometry, width, size, and placement of the pillars; hence, flow speed can vary from chip design to chip design, and potentially from chip to chip, due to manufacturing variability or temperature changes causing increased evaporation. In addition, some flow speed variability can be observed at the various stages of capillary pump filling.

To manipulate particles in a microfluidic channel with integrated electrodes, such electrodes need to be powered at a certain voltage, where the optimum voltage to be applied to the electrodes is highly dependent on the velocity of the particles being transported within the flow. Means for measuring flow velocity exist; however, they require expensive equipment and can only be performed in a laboratory environment. On the other hand, simpler means of measuring flow or particle speed at the time of an experiment are needed in order to readjust the voltage settings to accommodate variations in flow speed.

The current invention moves beyond the current techniques and/or materials.

Abbreviations that may be found in the specification and/or the drawing figures are defined in the text where appropriate.

BRIEF SUMMARY

This section is intended to include examples and is not intended to be limiting. The word "exemplary" as used herein means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

An example of an embodiment of the present invention is a method comprising applying a fluid into a microchannel at a location, wherein the fluid contains suspended particles, and wherein the fluid flows within the microchannel in a direction away from the location; generating a modulated electric field in the fluid by applying a voltage to electrodes near or within the microchannel; based on a configuration of the electrodes, deflecting the particles; and based on the deflection of the particles, determining the speed of the particles.

An example of another embodiment an apparatus, a microfluidic device, that comprises a substrate with a microchannel with a location where fluid can be applied, wherein the fluid flows in a direction away from the location, and wherein the fluid contains suspended particles, and electrodes generating a modulated electric field within the fluid by applying a voltage, wherein the electrodes are configured to deflect the particles flowing with the fluid according to the particle velocity.

An example of yet another embodiment is a system that comprises a microfluidic device with a micro channel wherein a fluid flows in a direction away from a location it is applied, wherein the fluid contains suspended particles and wherein one or more surfaces of the micro channel is transparent to inspection of inside the microchannel; the device further comprising electrodes generating a modulated electric field within the fluid by applying a voltage, wherein the electrodes are configured to deflect the particles flowing with the fluid; an image sensing device to capture the deflection of particles by the electrodes through at least one of the one or more inspection surfaces, wherein the image sensing device is connected to a computing device with processing software to extract speed information based on the deflection of the particles; and at least one feedback route to apply voltage adjustments to the electrodes.

An example of still another embodiment is an apparatus with means for a fluid to flow in a microchannel direction away from the fluid's application site, where the fluid contains suspended particles and the microchannel's interior can be monitored; means for generating a modulated electric field within the fluid, configured to deflect the particles flowing with the fluid; means to record or use the deflection of particles or information about the deflection of the particles by means of the monitoring by means of a computing device with processing software to extract speed information based on the deflection of the particles; and means to adjust the modulated electric field.

An example of a further embodiment, is a method comprising applying a fluid sample with suspended microparticles into a microfluidic channel, wherein the micro fluidic channel comprises a cover opposite the bottom, wherein the cover allows visual inspection inside the channel, wherein integrated onto the bottom of the microfluidic channel are electrodes, wherein the electrodes comprise patterned planar conducting materials, wherein electrical contact of the patterned planar conducting materials is ensured; generating highly localized modulated electric field distribution inside the channel and the fluid sample using the planar conducting materials; based on the generating, inducing DEP forces, wherein the DEP forces gradually increase along the length of the channel occupied by the electrodes, wherein the DEP forces counteract the hydrodynamic drag of the flow acting on the particles suspended in the fluid; and in response to the inducing, deflecting micro/nano-particles in the fluid sample at locations in the microchannel that are a function of the particles velocity; wherein that location information is being captured by an image sensing device through the microfluidic channel cover and stored in a computer memory device and wherein that location information being used to compute particle and flow speed.

An example of another further embodiment of the present invention is an apparatus comprising a microfluidic channel where a fluid sample with suspended microparticles can be applied into, wherein the microfluidic channel comprises a cover opposite the bottom, wherein the cover allows visual inspection inside the channel, wherein integrated onto the bottom of the microfluidic channel are electrodes, wherein the electrodes comprise patterned planar conducting materials, wherein electrical contact of the patterned planar conducting materials is ensured; and a generator to generate highly localized modulated electric field distribution inside the channel and the fluid sample using the planar conducting materials, wherein based on said generating, DEP forces are induced, wherein the DEP forces gradually increase along the length of the channel occupied by the electrodes, wherein the DEP forces counteract the hydrodynamic drag of the flow acting on the particles suspended in the fluid; and wherein in response to said inducing, micro/nano-particles in the fluid sample are deflected at locations in the microchannel that are a function of the particles velocity; wherein that location information is being captured by an image sensing device through the micro fluidic channel cover and stored in a computer memory device and wherein that location information being used to compute particle and flow speed.

In another example of yet another further embodiment of the current invention is a computer program product embodied on a non-transitory computer-readable medium in which a computer program is stored that, when being executed by a computer, would be configured to provide instructions to control or carry out applying a fluid sample with suspended microparticles into a microfluidic channel, wherein the microfluidic channel comprises a cover opposite the bottom, wherein the cover allows visual inspection inside the channel, wherein integrated onto the bottom of the microfluidic channel are electrodes, wherein the electrodes comprise patterned planar conducting materials, wherein electrical contact of the patterned planar conducting materials is ensured; generating highly localized modulated electric field distribution inside the channel and the fluid sample using the planar conducting materials; based on the generating, inducing DEP forces, wherein the DEP forces gradually increase along the length of the channel occupied by the electrodes, wherein the DEP forces counteract the hydrodynamic drag of the flow acting on the particles suspended in the fluid; and in response to the inducing, deflecting micro/nano-particles in the fluid sample at locations in the microchannel that are a function of the particles velocity; wherein that location information is being captured by an image sensing device through the microfluidic channel cover and stored in a computer memory device and wherein that location information being used to compute particle and flow speed.

In another example of still another further embodiment of the current invention is an apparatus comprising means for accepting an application of a fluid sample with suspended microparticles into a micro fluidic channel, wherein the micro fluidic channel comprises a cover opposite the bottom, wherein the cover allows visual inspection inside the channel, wherein integrated onto the bottom of the microfluidic channel are electrodes, wherein the electrodes comprise patterned planar conducting materials, wherein electrical contact of the patterned planar conducting materials is ensured; means for generating a highly localized modulated electric field distributions inside the channel and the fluid sample using the planar conducting materials; based on the generating, means for inducing DEP forces, wherein the DEP forces gradually increase along the length of the channel occupied by the electrodes, wherein the DEP forces counteract the hydrodynamic drag of the flow acting on the particles suspended in the fluid; in response to the inducing, means for deflecting micro/nano-particles in the fluid sample at locations in the micro channel that are a function of the particles velocity; wherein that location information is being captured by an image sensing device through the microfluidic channel cover and stored in a computer memory device and wherein that location information being used to compute particle and flow speed.

BRIEF DESCRIPTION OF THE DRAWINGS

In the attached Drawing Figures:

FIG. 4A contains a schematic representation of an example of the bead speed characterization electrode designs; FIG. 4B depicts an enlarged and parametrized view of a portion of the exemplary electrode design of FIG. 4A; FIG. 4C identifies various exemplary parameters and values for FIG. 4B;

FIG. 5A contains a schematic representation of another example of the bead speed characterization electrode designs; FIG. 5B depicts an enlarged and parametrized view of a portion of the exemplary electrode design of FIG. 5A; FIG. 5C identifies various exemplary parameters and values for FIG. 5B;

FIG. 7A contains a schematic representation of still yet another example of the bead speed characterization electrode designs; FIG. 7B depicts an enlarged and parametrized view of a portion of the exemplary electrode design of FIG. 7A; FIG. 7C identifies various exemplary parameters and values for FIG. 7B;

DETAILED DESCRIPTION OF THE DRAWINGS

Microfluidic devices often require transporting fluids and particles through the micro-channels and, therefore, require maintaining a flowing fluid for portions or the entire length of the experiment. This can be done by connecting the inlet and outlet of the microfluidic chip to external pumps to maintain approximately constant flow rate along the channel. The typical microchannel comprises dimensions in the nanoscopic and microscopic scale. Particles suspended in the fluid are also typically of nanoscopic and microscopic dimensions.

When employing integrated capillary pumps to sustain a flow rate in the microfluidic device, this flow rate is fixed by the geometry of the structure, with some variability observed from chip to chip due to manufacturing variability or during operation due to temperature changes. In addition, flow speed is usually greater during channel section filling than during the early stages of capillary pump filling, which in turn is greater than flow speed during the late stages of capillary pump filling.

For the integrated electrodes to exert an effect on the particles or cells flowing in the fluid, the DEP force induced by the applied voltage V needs to overcome the hydrodynamic drag of the fluid on the particles for a certain flow speed. Moreover, this applied voltage needs to be set carefully below an upper threshold that can cause electrolysis, bubbles and dissolution of the electrodes, but above a lower threshold that guarantees that the DEP force will overcome the hydrodynamic drag of the fluid on the particles. Especially when aiming to separate beads of different size or material properties, the range of working voltages applied to the electrodes that guarantees proper separation is within a narrow range and highly dependent on the velocity of the particles within the flow.

Such variations of the flow speed between devices or even within the same chip at different instants of an experiment are detrimental to the proper and optimum operation of the device relying on DEP forces for its functionality. Thus, means to measure variations in flow speed in absolute or relative terms are needed in order to readjust the voltage settings in real time or in a pre-programmed manner. Such capability could be even more useful if made independent of a user manually adjusting the voltage, especially for point of care applications.

Means and equipment for measuring flow velocity exist; however, they require expensive equipment (high speed laser, camera, confocal microscopes, fluorescent tracers, etc.), which is a complex experimental setup, and can only be performed in a laboratory environment.

Figure 1:
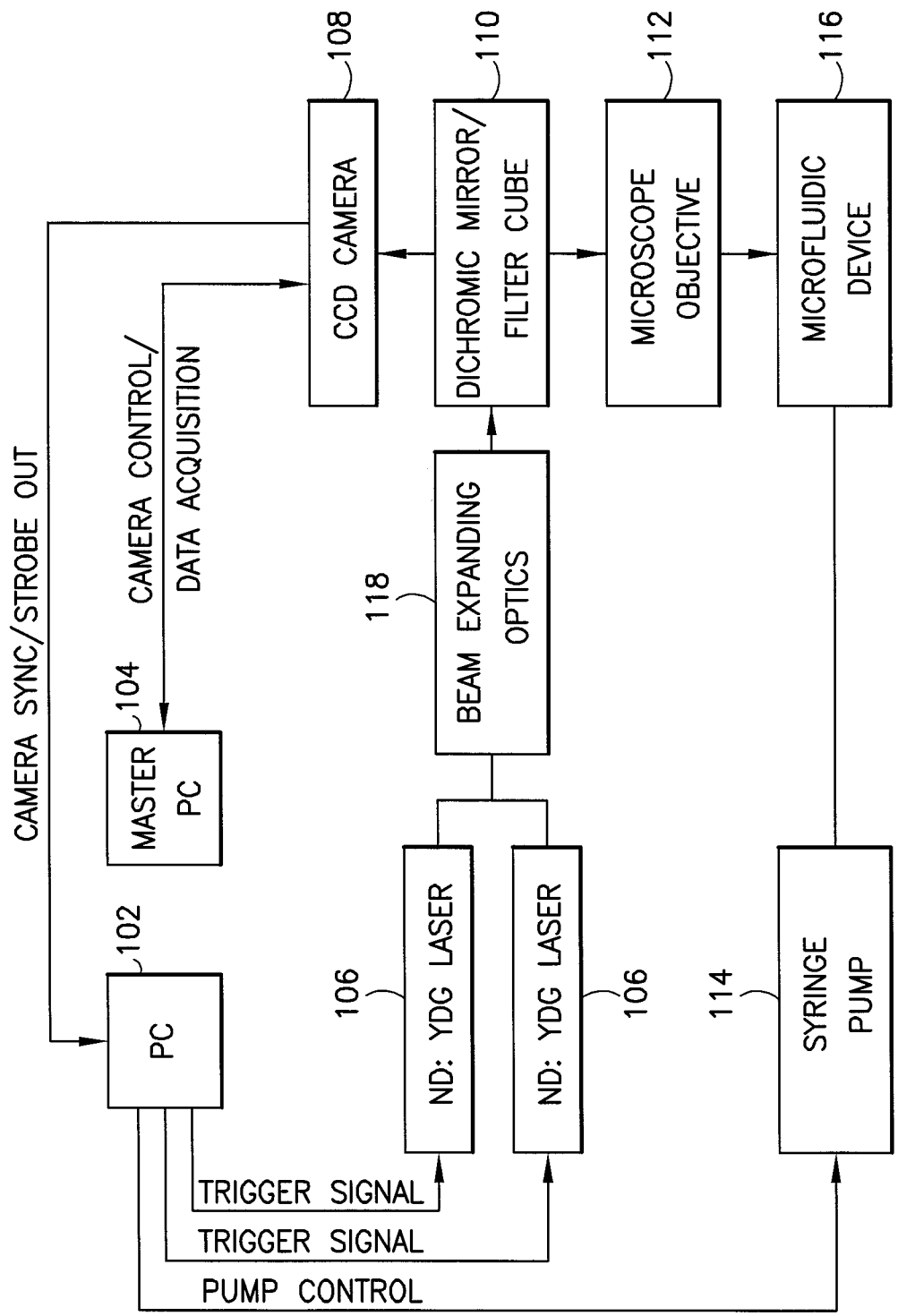
FIG. 1 is a block diagram of a representative micro PIV system used for measuring and visualizing flow velocity.

FIG. 1 is directed to such previous means for measuring and visualizing flow velocity such as microPIV (particle image velocimetry) with high temporal resolution ($\Delta t < 100$ nsec) or high speed cameras with PTV (particle tracking velocimetry) software.

Regular cameras such as those in mobile phones or even conventional microscopes often do not offer sufficiently fine temporal resolution to capture fast moving particles (often up to 30 frames/sec, $\Delta t = 33$ msec between frames), making it difficult to extract particle speed information. Even high speed cameras can be limited in field of view when using very high speed settings. Variations of the height at which the particle is being transported relative to the optical setting focal plane also affect the capture resolution.

A common microPIV system configuration, as can be seen in FIG. 1, consists of two pulsed lasers 106 to illuminate the flow in the microchannel of microfluidic device 116 via the beam expanding optics 118. The fluid has been previously seeded with fluorescent traces which are particles of microscopic or nanoscopic dimensions, and their emission is collected by an epifluorescence microscope 112 that separates it from the illumination light with a dichroic mirror 110. The final images are recorded by a double-frame CCD camera 108 and processed with specialized PIV software on a computer 104 to extract velocity field information in the micro scale from the fluorescent signal. The two exposures of laser light are required to be captured with high temporal resolution, for which an additional computer 102 controls and synchronizes the triggers for the camera and the lasers 106. Optionally, computer 102 can control the pumping of fluid from the syringe pump 114 into the microfluidic device 116.

In order to overcome some of the disadvantages of the current state of affairs, exemplary embodiments of the current invention look to use novel optimized designs of electrode structures placed at determined locations along the microchannel specified during the design of the device to characterize bead and flow speed and provide feedback through a control loop to fine tune the necessary voltage required for electrodes downstream with specific functionality (concentration, separation, trapping, etc.).

The structures exploit the relation when the DEP force first overcomes the hydrodynamic drag of the fluid and deflects flowing beads laterally but, instead of manually and gradually varying the voltage applied to the electrodes while capturing images or filming a video to observe this effect, it uses the dependency of the electric field with the gap width between electrodes to determine the speed of the beads based on the position within the electrode structure where beads first experience deflection due to the condition that the DEP force counteracts the hydrodynamic drag of the fluid on the particle. Such deflection can arise using negative-DEP (which could be referred to as "repulsion") or using positive-DEP with similar purpose.

Several electrode structure designs are proposed with the common feature of gradually varying gap width between electrodes (or electrode width) in the direction of the flow.

Experimental results can then be compared to rigorous simulations of the expected path of the particles to either deduce absolute values of the particles and flow speed, calibrate unknown parameters of models describing the flow speed used in the simulations of future electrode designs, or measure relative variations of flow speed to adjust the electrodes voltage accordingly and in real time.

For such integrated electrodes to exert an effect on the particles or cells flowing in the fluid, the DEP force induced by the applied voltage V needs to overcome the hydrodynamic drag of the fluid on the particle or, in other word, the forces need to be of equal magnitude but opposite direction. In one exemplary theoretical formulation of the forces acting on the particle, the classic analysis that models the induced polarization of ions inside the particle when immersed in an electric field as a dipole, the DEP force at every point in space, denoted by the vector r, and due to a voltage V applied to the electrodes, is determined by the following equation:

$$F_{DEP}(r,V) = 2\pi R^3 \varepsilon_m CM \cdot \nabla |E(r,V)|^2 \qquad (2).$$

On the other hand, the hydrodynamic drag of the fluid on the particle is given for laminar flows by Stokes law according to the following equation:

$$F_{Drag}(r) = 6\pi R \eta C_w v_p(r) \qquad (3),$$

where $v_p$ denotes the velocity of the particle of radius R, assumed to be flowing at the same speed as the fluid of viscosity $\eta$ within the channel, in steady state and with no flow deformation. The term $C_w$ represents a wall correction factor. Assuming the design and material properties of the channel and particles are fixed, for a certain particle velocity ($v_p(r)$) at a given position within the channel r, the condition at which the DEP force counteracts the hydrodynamic drag of the fluid, that is, $F_{DEP} = -F_{Drag}$, will happen at a certain voltage V applied to the electrodes (E(r, V)).

Based on the above formulation, the trajectory of a microparticle flowing within a microfluidic device that contains integrated electrodes generating an electric field can be computed by numerically solving for the electric and fluid velocity field equations and computing the combined forces acting on the particle, $F_{Tot} = F_{DEP} + F_{Drag}$. Other potential forces acting on the particle (electrothermal, gravitational, etc.) may be also included whenever their effect is deemed non-negligible.

The theoretical position of the particle along the channel length at each instant of time is calculated by solving Newton's law of motion, $F_{Tot} = m\ddot{r}$ (where m is the mass of a particle and $\ddot{r}$ is the second derivative of the particle position r with respect to time or instantaneous acceleration of the particle. Given the small size of the particles, no flow deformation is considered and an equivalent point force formulation at the particle center is adopted. Without DEP influence, particles are transported at the speed of the flow along the laminar flow streamlines at random heights in the channel Under negative-DEP influence, particles are immediately lifted to the top of the channel away from the electrodes (assumed on the channel bottom) with DEP forces on the plane parallel to the electrodes being responsible for changes to their lateral position. Since the characteristic time scale of acceleration phase of the particle motion in response to an applied force is much smaller than the time scale of the variation of the external forces and the time to traverse the electrode structure, the particles are presumed to travel at their terminal velocity. This eliminates the mass dependency in the equation for $\ddot{r}$, the particle velocity, and to solve for the particle position at each time increment by integrating over the resulting velocity induced by the balance of forces on the particle. Other formulations could be envisioned including more or less approximations.

In order to manipulate particles in a microfluidic channel with integrated electrodes, they need to be powered at a certain voltage. This applied voltage needs to be set carefully to satisfy at least the following two requirements:

keeping the voltage below a particular maximum value, where voltage above that maximum value will cause electrolysis, bubbles, and dissolution of the electrodes;

keeping the voltage slightly above a threshold since, for trapping or deflecting of particles, the voltage needs to be slightly above a threshold that guarantees that the DEP force will overcome the hydrodynamic drag, In addition, when aiming to separate particle populations based on their different response to varying levels of DEP force, the optimum voltage value applied to the electrodes needs to be even more carefully tuned within a narrower range.

Figure 2:
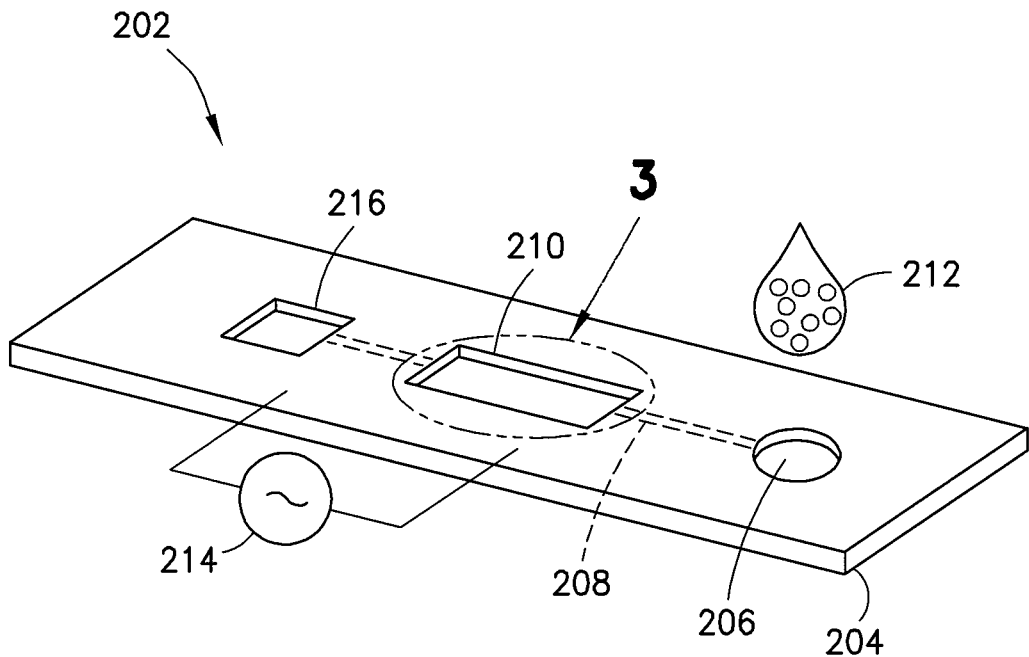
FIG. 2 is a schematic representation of bead speed characterization microfluidic device design using customized electrode structures.

FIG. 2 depicts a non-limiting example of bead speed characterization microfluidic device design using customized electrode structures placed at known locations along the microchannel in combination with customized processing software to characterize particle and flow speed and/or provide feedback in real time through a control loop to fine tune the necessary voltage required for additional electrodes downstream or upstream in the microchannel (or on a parallel channel) with a specific functionality (concentration, separation, trapping, etc.).

Microfluidic device 202 consists of the silicon chip 204 itself where an inlet 206 allows sample 212 to be deposited therein which can travel through microchannel(s) 208 through the speed measuring area 210 onto functional area 216 where measurements of the sample can be made. The speed measuring area 210 and the functional area 216 are also connected by a feedback loop 214 as part of the control mechanism of this invention.

Figure 3:
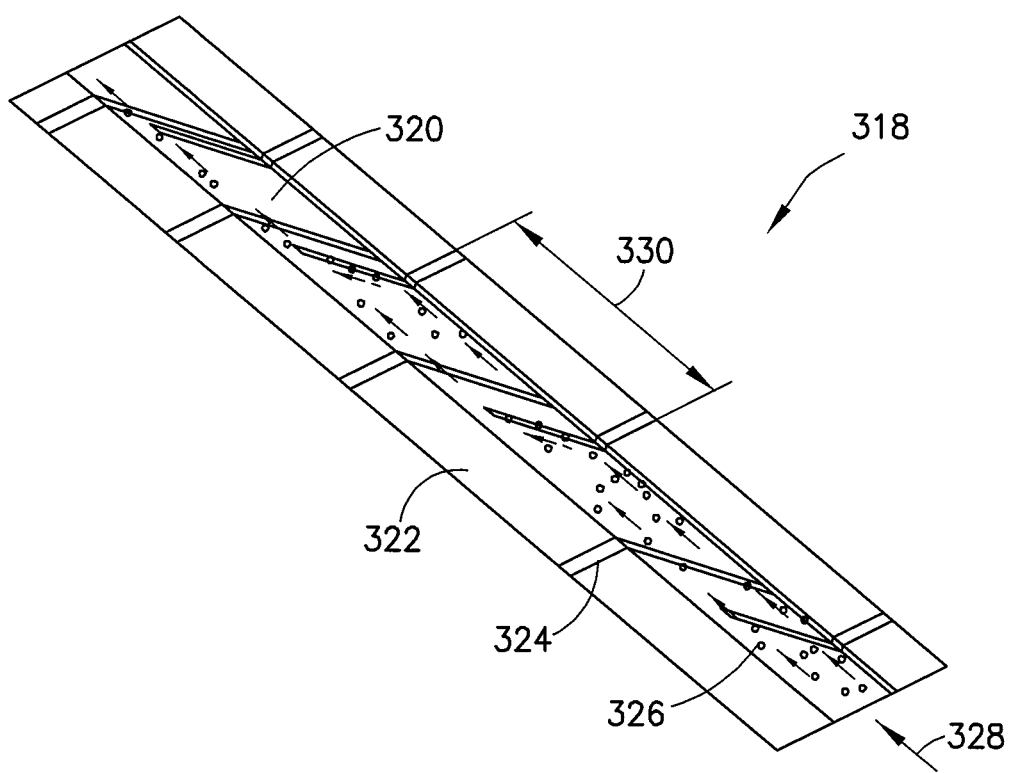
FIG. 3 is a schematic representation of bead speed characterization electrode design in expanded view.

As can be seen in FIG. 3, an example of the bead speed characterization electrode design 318 is shown, where the measuring area 210 of the microchannel 208 of microfluidic chip 202 of FIG. 2 is shown in an expanded view with the flow 328 of beads 326 through the microchannel 320. The arrangement of electrodes 324 has them protruding out from both sides of the microchannel 320 for electrical contact (note that microchannel 320 is that part of microchannel 208 within this close-up view) and onto substrate 322. The substrate 322 may be a portion of a silicon chip, such as the silicon chip 204 depicted in FIG. 2. The width between electrode pairs in this structure decreases gradually with distance traveled by the particles. For different particle speeds, different range of the electrode gaps 330 will cause bead deflection on otherwise identical particles.

The current invention teaches various exemplary electrode structures in FIG. 4 through FIG. 7, which collectively depict four different non-limiting electrode structures, where these customized electrode structures exploit the condition when the DEP force experienced by the flowing particles first overcomes the hydrodynamic drag of the fluid, that is:

$$\text{DEP Force} = -\text{Drag Force or } 2\pi R^3 \varepsilon_m CM\nabla |E(r;V)|^2 = -6\pi R\eta C_w v_p(r) \quad (4).$$

But, as described earlier herein, instead of manually and gradually varying the voltage applied to the electrodes while capturing images or filming a video, it uses the dependency of the electric field with the electrode geometry (mainly the gap between electrodes) to determine the speed of the beads based on the position within the electrode structure where beads first experience deflection due to the condition that the DEP force counteracts the hydrodynamic drag of the flow.

Several electrode structure designs are proposed with the common feature of gradually varying gap width (or electrode shape) in the direction of the flow. Other electrode structure designs can be envisioned with similar goal.

By employing the present invention, examples of simulated response of particles flowing over the "speed characterization electrodes area" at various heights within the channel show that flow and particle speed from top to bottom of the microchannel height follows a parabolic curve, with particles flowing faster at the middle of the channel. The gap between electrodes decreases in the direction of the flow; hence faster particles are affected by the DEP force later in the structure. The range of gap widths where beads are being affected by DEP gives the range of bead speeds expected in the channel depending on their flowing height within channel. Shifts in this range can indicate changes in maximum bead speed.

In FIG. 4 through FIG. 7, the difference between the location of the first and last electrode causing bead deflection, is used to deduce bead/flow speed.

FIG. 4A displays design 402 occupying a section of microchannel 404 and which arranges the electrodes 406 in a slanted configuration of alternating lateral extent, with increasingly narrower gaps 408 in the direction of the flow 410. FIG. 4B depicts an enlarged and parametrized view of a portion of the electrode design 402 identifying a few representative dimensions which are collected in the table of FIG. 4C. Both electrode and gap widths are measured as indicated in FIG. 4B, with EW denoting electrode width, GW denoting the width of the last gap of the structure, and ΔGW representing the gap width difference between two adjacent electrode pairs. In addition, the inclination angle is described by Theta (θ), the channel width denoted ChW, and the length every second electrode extends is given by half the channel width.

FIG. 5A displays design 502 occupying a section of microchannel 504 where electrodes 506 are arranged in pairs, following a semicircle design (where the radius of a circle based on such semicircular design would be radius R) with increasingly narrower gaps 508 in the direction of the flow 510. FIG. 5B depicts an enlarged and parametrized view of a portion of the electrode design 502 identifying a few representative dimensions which are collected in the table of FIG. 5C. FIG. 5B shows how both electrode and gap widths are measured, with EW denoting electrode width, GW denoting the width of the last gap of the structure, and ΔGW in FIG. 5A representing the gap width difference between two adjacent electrode pairs separated a distance ΔY.

Figures 6A, 6B, 6C:
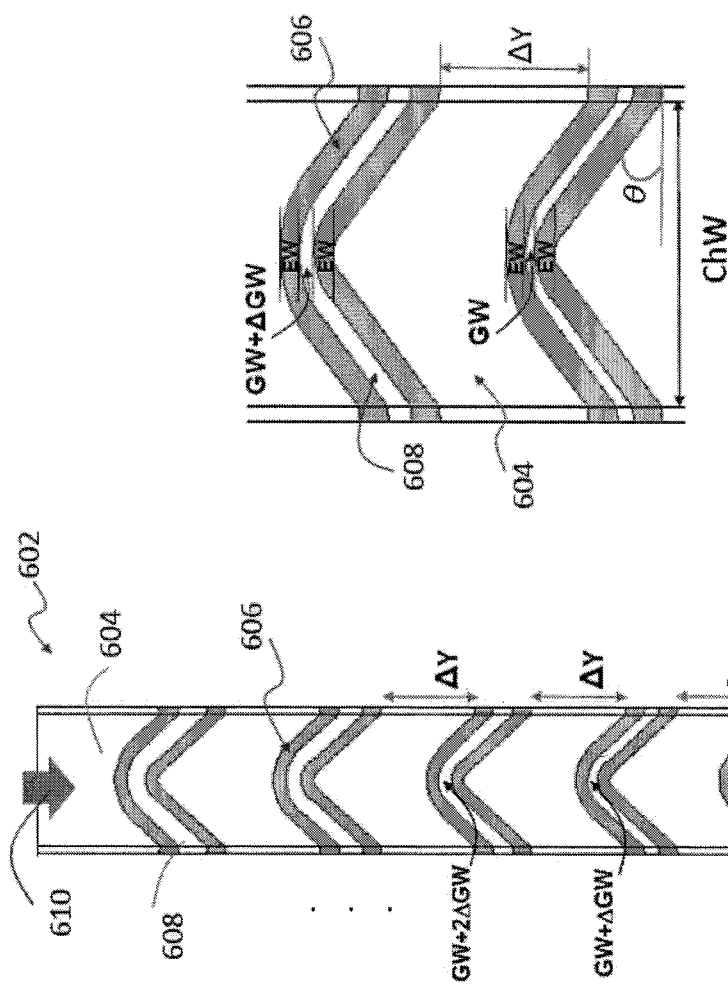
FIG. 6A contains a schematic representation of yet another example of the bead speed characterization electrode designs.
FIG. 6B depicts an enlarged and parametrized view of a portion of the exemplary electrode design of FIG. 6A.
FIG. 6C identifies various exemplary parameters and values for FIG. 6B.

FIG. 6A displays design 602 occupying a section of microchannel 604 where electrodes 606 are arranged in pairs, following a symmetrical slanted configuration of curved joints, with increasingly narrower gaps 608 in the direction of the flow 610. FIG. 6B depicts an enlarged and parametrized view of a portion of the electrode design 602 identifying a few representative dimensions which are collected in the table of FIG. 6C. FIG. 6B shows how electrode width (EW), gap width (GW), the width difference (ΔGW) between two adjacent electrode pairs separated by a distance ΔY and their inclination angle Theta (θ), which is the angle relative to an imaginary line along the channel diameter or channel width (ChW), are defined.

FIG. 7A displays design 702 occupying a section of microchannel 704 where electrodes 706 are arranged in pairs, following an arched design, with increasingly narrower gaps 708 in the direction of the flow 710. FIG. 7B depicts an enlarged and parametrized view of a portion of the electrode design 702 identifying a few representative dimensions which are collected in the table of FIG. 7C. As with previous designs, FIG. 7B indicates how EW and GW are measured, as well as the radius of the first arch R1 (measured from the center of the channel as shown), the radius of the second arch R2 (measured from the center of the channel as shown), and the sum of the angles of each arch being Theta (θ) as shown. The gap between two consecutive arched electrode pairs separated a distance ΔY has a difference in width ΔGW.

Figure 8A:
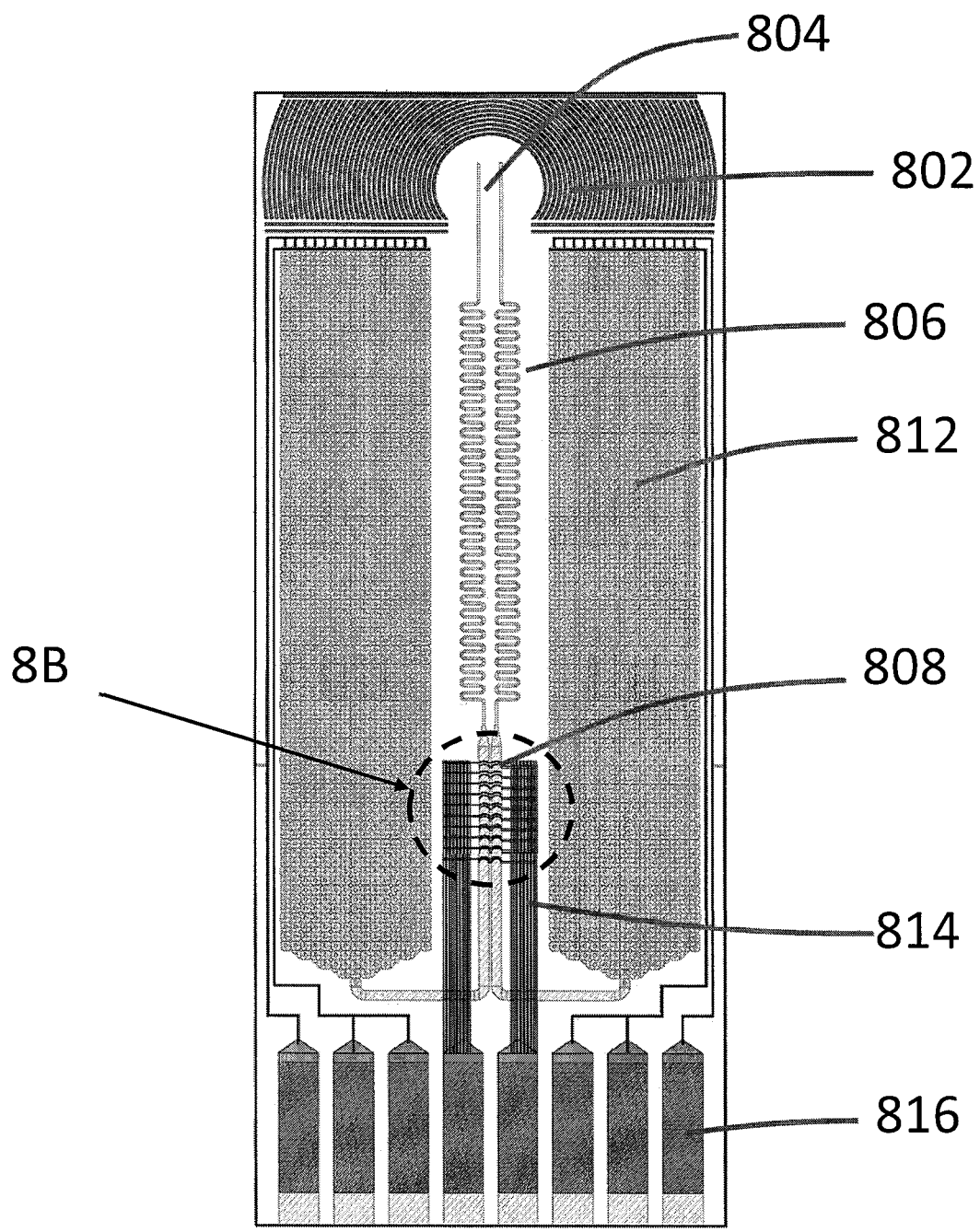
FIG. 8A is an exemplary microfluidic device layout representation that includes a speed measurement electrode structure.

FIG. 8A represents one embodiment of integration of the speed measurement electrode structure 808 within a microfluidic device comprising a fluid loading pad 802, two parallel microchannels 804, a varying hydraulic resistance section 806 along the fluid path and an integrated capillary pump 812. The speed measurement electrode structure 808 is connected, via several integrated metallic wires 814, to a set of eight contacts 816 compatible with microSD format that supply the necessary electric power.

Figure 8B:
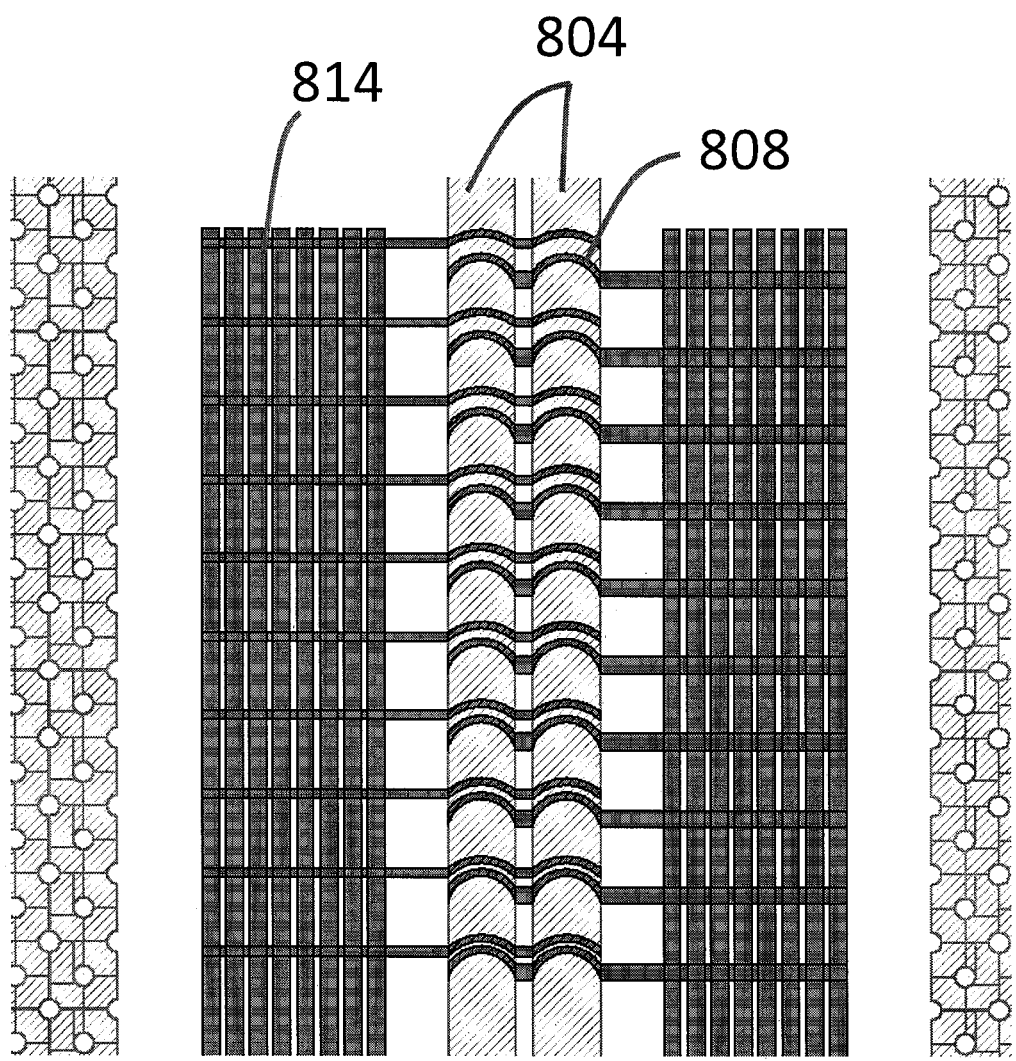
FIG. 8B depicts an enlarged area speed measurement electrode structure of FIG. 8A.

FIG. 8B is an enlarged view of the speed measurement structure 808 integrated in the microfluidic device comprising two parallel microchannels 804. As a results, two electrode structures 808 are integrated, one in each channel, connected to the power contacts through the corresponding wires 814. The example displayed is of an electrode structure corresponding to the exemplary embodiment design 502 in FIG. 5 of semicircled electrode pairs with increasingly narrower gaps in the direction of the flow, with the range of gap widths being large enough to affect all expected flow velocities. Alternatively, any other representative designs or other structures of similar functionality could be integrated in the microchannel in a similar manner.

Figure 9:
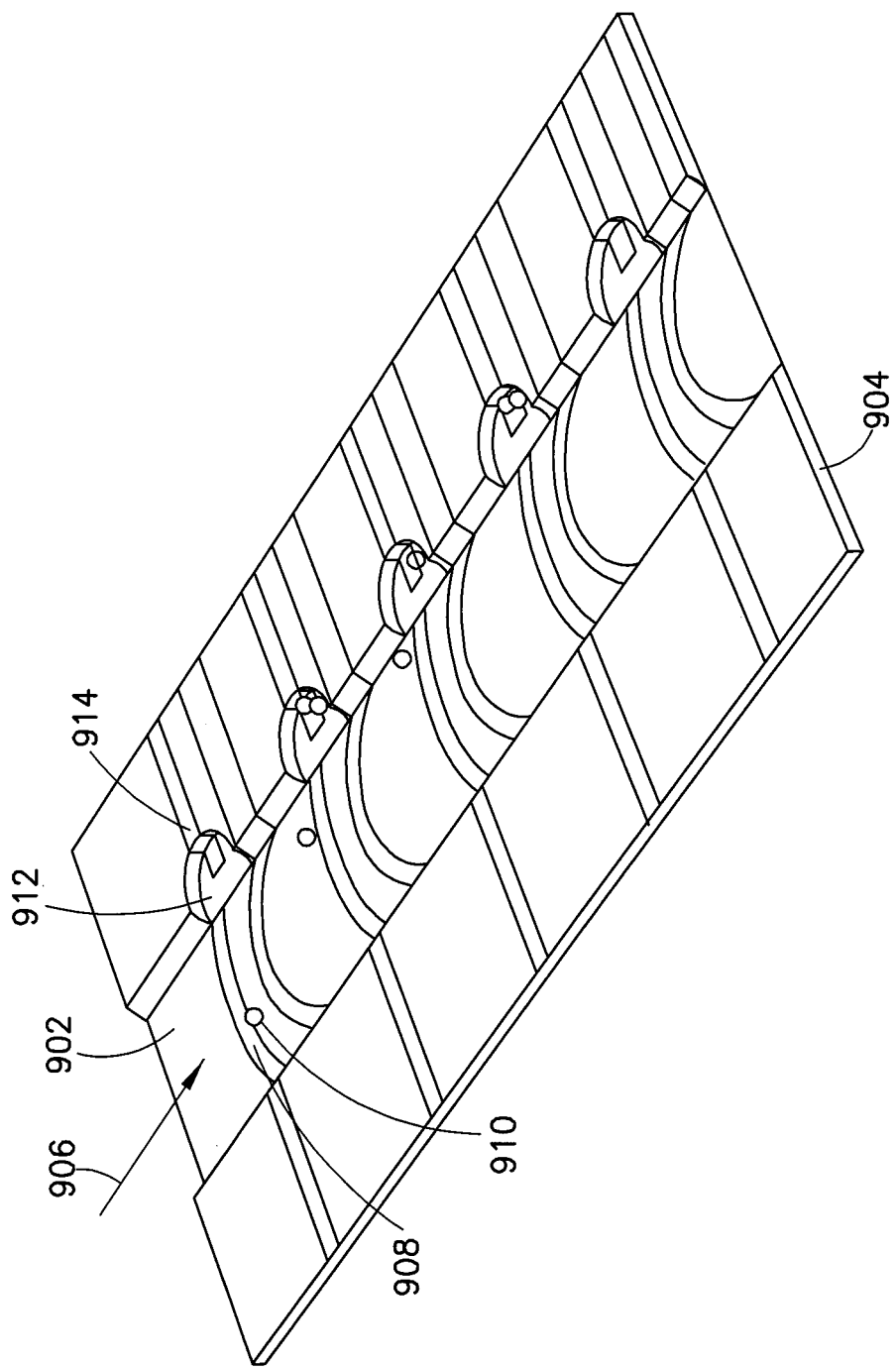
FIG. 9 represents an alternative exemplary design of a speed measurement electrode structure for simplified image capture and processing algorithms.

FIG. 9 shows an alternative embodiment of a speed measurement electrode structure integrated in a microchannel 902 fabricated in a substrate 904 consisting of one of the designs from FIG. 4 through FIG. 7 placed against the flow 906, where the image capture and processing algorithms can be simplified by introducing small side chambers 912 along the channel wall, aligned with the various electrode pairs 908 distributed along the channel. Chambers could also be replaced by small side channels leading to chambers. In this manner, deflected beads 910 would be pushed into the chambers and remain there while the voltage powering the electrodes is turned on. If using an optical or fluorescence microscope, detection and determination of the bead position can be made easier because the target beads are immobile and localized.

Optical detection can be replaced by electrical detection by implementing additional electrodes 914 within these chambers, which need not necessarily be independent from the ones in the channel, to measure changes in impedance induced by the accumulation of beads in the chamber. This alternative solution may require additional electrical contacts for electrical measurements, but eliminates the need for more cumbersome optical detection.

Processing algorithms correlating bead trap location and original flow/bead speed can be easily adjusted for an impedance based measurement instead of optical based measurement.

Alternatively, dielectrophoretic forces may be replaced by acoustic forces to counteract the hydrodynamic drag of the flow while keeping roughly the same microfluidic device configuration and operation. Planar integrated electrodes on the bottom of the microchannel fabricated on a piezoelectric substrate can be used to generate surface acoustic waves (SAW) within the fluid to apply a force on the particles depending on their acoustic properties. A custom electrode layout may be designed to induce a speed dependent deflection of the flowing particles in a similar fashion as with DEP forces.

FIG. 10 collectively shows that these electrode designs can be used according to 3 configurations.

Figure 10A:
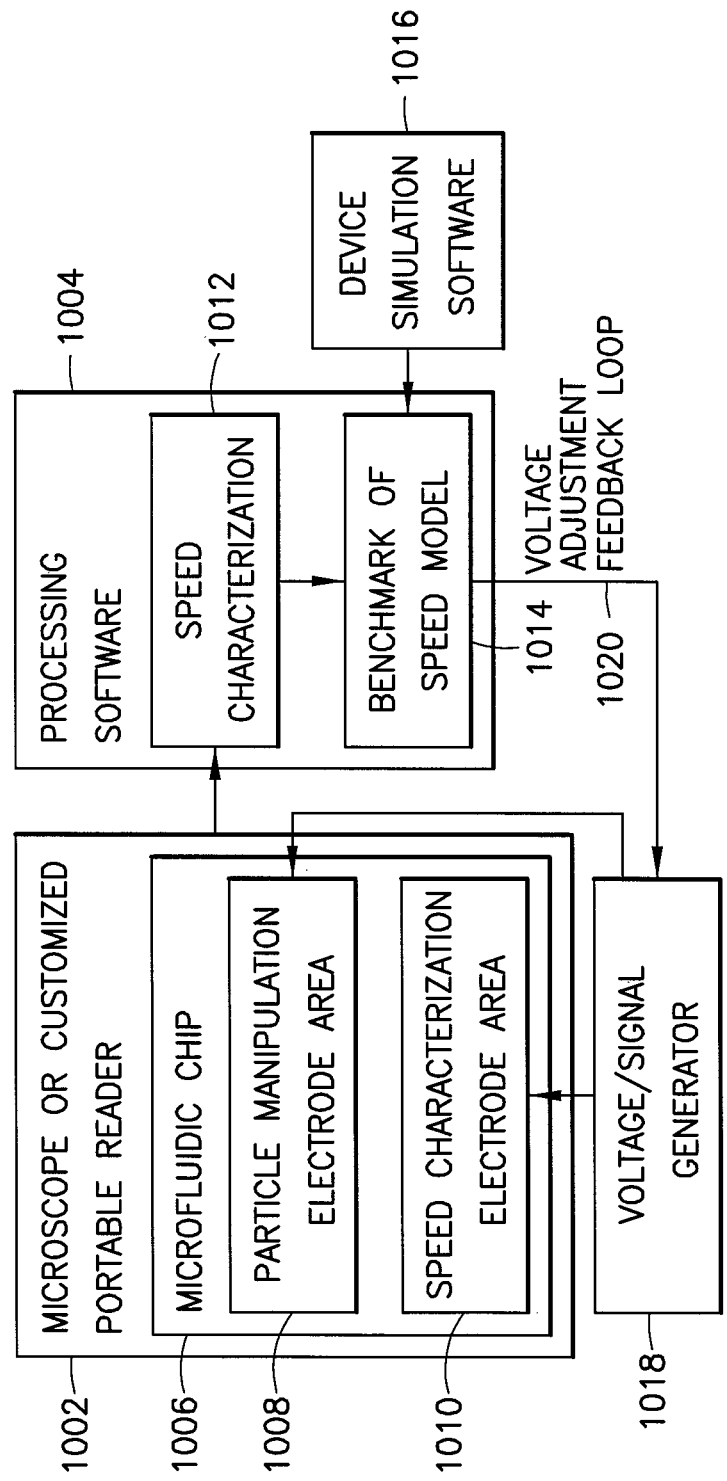
FIG. 10A and FIG. 10B show block diagrams of various exemplary system configurations for particle speed extraction and voltage feedback.

FIG. 10A illustrates a block diagram of a first exemplary configuration for an absolute speed extraction with real time voltage feedback, where experimental results are compared to rigorous simulations of the expected path of the particles to deduce absolute values of the speed of the particles and flow.

FIG. 10A also represents a block diagram of a second exemplary configuration for a relative speed variation extraction with real time voltage feedback, where in the absence of rigorous simulation software, relative variations of flow speed can be measured.

In FIG. 10A, a microscope or portable reader 1002 contains a microfluidic chip 1006 that comprises a particle manipulation area 1008 and a speed characterization area 1010. The microscope or portable reader 1002 is connected to at least one processor or at least one processor combined with at least one memory (not shown) that contains some processing software 1004 that comprises speed characterization module 1012 and a benchmark of a speed model module 1014. Such benchmark module 1014 may arise from device simulation software 1016. The simulation software can be resident within the same at least one processor or at least one processor combined with at least one memory as the processing software or within a separate at least one processor or at least one processor combined with at least one memory. The processors and memories could also reside on the same chip as the microfluidic chip although they can of course be on separate chips that are interconnected to provide the functionality described herein. Moreover, the computer processors and/or memories could also reside on some remote device and connect to the microfluidic device by a communications link. The microfluidic chip 1006 within the microscope or portable reader 1002 has a voltage/signal generator 1018 connected to the particle manipulation area 1008 and the speed characterization area 1010 where the voltage is adjusted via a feedback loop 1020 connected to the benchmark module 1014.

Figure 10B:
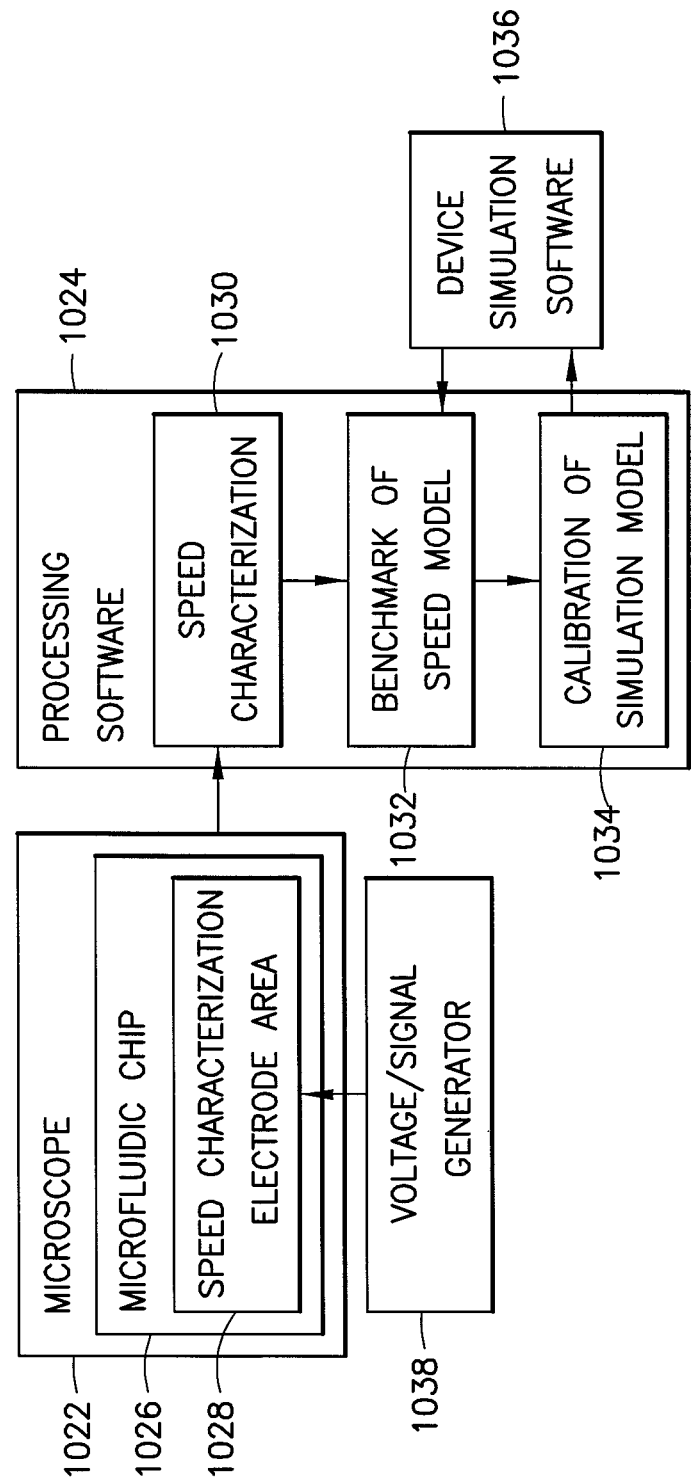

FIG. 10B represents a block diagram of a third exemplary configuration for an offline model calibration where these speed characterization electrodes are used to provide feedback in the design of DEP electrodes of future chips. Such a configuration enables calibrating unknown parameters of computational models describing the flow speed used in the rigorous simulations guiding the design of future electrode geometries. Initial simulation models may be using approximate values for certain parameters or material properties and can be improved upon using data deduced from this method.

In FIG. 10B, a microscope 1022 contains microfluidic chip 1026 which comprises a speed characterization electrode area 1028. This speed characterization electrode area 1028 is controlled with a voltage/signal generator 1038. The microscope 1022 sends information to at least one processor or at least one processor combined with at least one memory (not shown) that contains some processing software 1024 which comprises an interconnection between a speed characterization module 1030, a benchmark of the speed model module 1032, and a calibration of the simulation model module 1034. The calibration of the simulation model module 1034 can be fed into device simulation software 1036 which in turn can provide the benchmark module 1032. Again, as discussed above in the description of FIG. 10A and applicable to the embodiments discussed in both FIG. 10A and FIG. 10B and not limited to those exemplary embodiments of the current invention, the physical characteristics of the processing power and memory storage is not fixed, such that the software could reside on the same chip as the microfluidic device, on different chips, remotely, or by means of some other connection be it physical, electronic, or wireless or some combination thereof.

Figure 11:
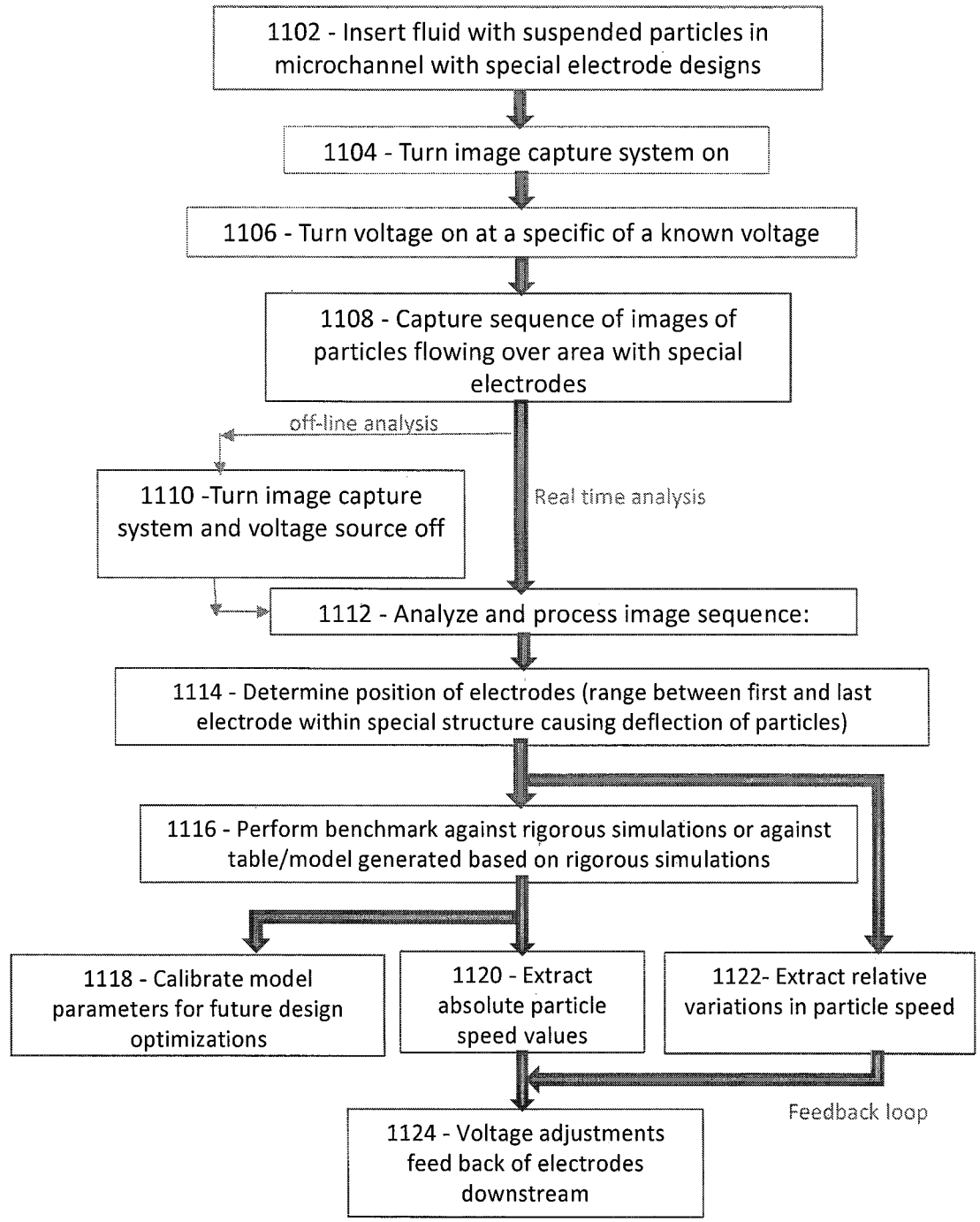
FIG. 11 is a logic flow diagram for flow and bead speed characterization in microfluidic devices, and illustrates the operation of an exemplary method, a result of execution of computer program instructions embodied on a computer readable memory, functions performed by logic implemented in hardware, and/or interconnected means for performing functions in accordance with exemplary embodiments.

FIG. 11 represents a flow diagram referring to all 3 configurations of the invention described above referring to FIG. 10A and FIG. 10B.

Block 1102 represents inserting fluid with suspended particles into a microchannel with electrode designs as disclosed herein.

Block 1104 represents turning on an image capturing system while block 1106 represents turning on the voltage to an initial voltage.

At the step represented by block 1108, a sequence of images of particles flowing over area with special electrodes can be captured.

At this stage, the analysis can be performed either off-line or can continue in real time.

For an off-line analysis, block 1110 represents turning the image capture system off and turning the voltage source off. A real time analysis would mean that the image capture system and the voltage source would not need to be turned off.

In either case, as represented by block 1112, the image sequence is analyzed and processed, as shown in block 1114, to determine the position of the deflecting electrodes (the range between the first and last electrode within the special structure causing deflection of particles) and, as shown in block 1116, to perform benchmarking against rigorous simulations or against table(s)/model(s) generated based on rigorous simulations.

By determining the position of the deflecting electrodes (the range between the first and last electrode within the special structure causing deflection of particles) as shown in block 1114, the relative variations in particle speed can be extracted as depicted in block 1122.

The determining of block 1114 and the performing benchmarking of block 1116 permits, as shown in block 1118, calibrating model parameters for future design optimizations and, as shown in block 1120, extracting absolute particle speed values.

Moreover, by extracting relative variations in particle speed as depicted in block 1122 and by extracting absolute particle speed values as depicted in block 1120, a feedback loop can be employed to make voltage adjustments of electrodes downstream, as shown in block 1124.

Thus, an offline model calibration method would employ the steps represented by blocks 1110 (rather than the direct route from block 1108 to block 1112) and 1118 (rather than blocks 1120 or 1122). A method for an absolute speed extraction with real time voltage feedback would employ the steps represented by blocks 1120 (rather than blocks 1118 or 1122) and 1124 while a method for relative speed variation extraction with real time voltage feedback would employ the steps represented by blocks 1122 (rather than blocks 1118 or 1120) and 1124.

Note that image or video capture system in FIG. 11 refers to either conventional microscope imaging system or to state of the art mobile cameras with standard image capture speed. Mobile phone cameras would likely require the addition of an optical attachment containing at least a simple magnifying lens.

Non-limiting characteristics of microfluidic devices can include various common elements as described below.

Without in any way limiting the scope, interpretation, or application of the claims appearing below, certain design details used in the creation of this invention included common particle/cell types such as polystyrene, latex, silica beads, with sizes between 200 nm and 50 μm; biological red blood cells, white blood cells, and others of sizes 1 μm to 50 μm.

Without in any way limiting the scope, interpretation, or application of the claims appearing below certain design details used in the creation of this invention included common voltage configurations in the form of an AC signal @ 1 MHz to 100 MHz with sinusoidal, square or triangular signal with a peak to peak voltage between $1V_{pp}$ to $20V_{pp}$ to avoid biological damage or electrode break down.

Without in any way limiting the scope, interpretation, or application of the claims appearing below certain design details used in the creation of this invention included common channel width dimensions of 100-500 μm, with height of 10-100 μm, electrode/gap widths of 5-250 μm, and flow speeds up to 1 or 2 mm/s.

Without in any way limiting the scope, interpretation, or application of the claims appearing below certain design details used in the creation of this invention included common properties of metallic electrodes of a thickness of 50 nm-100 nm and materials aluminum (Al), gold (Au), platinum (Pt), palladium (Pd).

Without in any way limiting the scope, interpretation, or application of the claims appearing below certain design details used in the creation of this invention included common camera/image capturing element types such as CCD or CMOS image sensors integrated in the channel or in close proximity to channel with 15 to 30 frames per second, 2 to 20 Megapixels, with a standard microscope image capturing element or camera, fluorescence or white light or a portable camera and white light illumination from mobile phone.

The processing software and/or the simulation software can include software for a user interface (which can be a graphical user interface) where the user, physically using some user interface device, can interact at the various steps of the speed benchmarking sequence, selecting the appropriate parameters and models, and choosing to apply feedback to the system manually if desired.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 11. A computer-readable medium may comprise a computer-readable storage medium that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is that video capture and subtraction between frame and a reference frame can easily detect the presence of dark spot (bead) on each electrode without losing incoming speed information (set by the relation $F_{DEP}=-F_{Drag}$). When beads are first stopped by the electrode, they slide through the electrode slowly enough that the feature can easily be identified as a bead. Location is unambiguously determined by knowledge of electrode position, relaxing image alignment requirements. This relaxes the need for speed of the camera and can relax also the spatial resolution requirements, allowing for larger field of view.

Another advantage or technical effect of one or more of the exemplary embodiments disclosed herein is that the effect of the speed characterizing structures can be combined with other functions necessary for the operation of the device (for example, deflecting all particles towards one side of the channel for concentration).

Yet another advantage or technical effect of one or more of the exemplary embodiments disclosed herein are applicable at least for low cost flow cytometry, point of care devices, fluid flow characterization, and field flow fractionation.

A further advantage or technical effect of one or more of the exemplary embodiments disclosed herein is that, micro/nano-particles in the fluid sample are deflected by the induced forces at locations in the microchannel that are a function of the particles velocity. The deflections can be captured by sensing equipment, stored in a computer memory device, to use the location information to compute particle and flow speed such that the nature or composition of the particles can be determined.

A still further advantage or technical effect of one or more of the exemplary embodiments disclosed herein are that microfluidic chips with microfluidic channels can be made using standard semiconductor manufacturing technology.

An example of an embodiment, which can be referred to as item 1, is a method comprising: applying a fluid into a microchannel at a location, where the fluid contains suspended particles, and where the fluid flows within the microchannel in a direction away from the location; generating a modulated electric field in the fluid by applying a voltage to electrodes near or within the microchannel; based on a configuration of the electrodes, deflecting the particles; and based on the deflection of the particles, determining the speed of the particles.

An example of a further embodiment, which can be referred to as item 2, is the method of item 1 where applying a voltage generates an electric field distribution inside the fluid in the micro channel.

An example of a further embodiment, which can be referred to as item 3, is the method of item 2, where the electric field distribution induces particle deflecting forces that gradually increase along the microchannel engaged by the electrodes.

An example of a further embodiment, which can be referred to as item 4, is the method of item 1 where the deflection of the particles depends on the electric field producing a dielectrophoretic force counteracting a hydrodynamic drag force of the fluid on the particles within the microchannel.

An example of a further embodiment, which can be referred to as item 5, is the method of item 4 where determining the speed of the particles is based on a position where the particles first experience the deflection.

An example of a further embodiment, which can be referred to as item 6, is the method of item 1, where the electrodes are made of patterned planar conducting materials integrated in the microchannel.

An example of a further embodiment, which can be referred to as item 7, is the method of item 1, wherein one or more surfaces of the microchannel allows for viewing inside the microchannel.

An example of a further embodiment, which can be referred to as item 8, is the method of item 1, that further comprises capturing the deflection of particles by the electrodes through the viewing surface with an image sensing device.

An example of a further embodiment, which can be referred to as item 9, is the method of item 8, that further comprises extracting information regarding the speed of the particles by using processing software in at least one computing device connected to the image sensing device.

An example of another embodiment of the present invention, which can be referred to as item 10, is an apparatus, that comprises a substrate with a microchannel with a location where fluid can be applied, where the fluid flows in a direction away from the location, and wherein the fluid contains suspended particles; and electrodes generating a modulated electric field within the fluid by applying a voltage, where the electrodes are configured to deflect the particles flowing with the fluid according to the particle velocity.

An example of a further embodiment, which can be referred to as item 11, is the apparatus of item 10 where a voltage applied to the electrodes generates an electric field distribution inside the fluid inducing particle deflecting forces that gradually increase along the microchannel covered by the electrodes.

An example of a further embodiment, which can be referred to as item 12, is the apparatus of item 10 where the electrodes are made of patterned planar conducting materials integrated in the microchannel.

An example of a further embodiment, which can be referred to as item 13, is the apparatus of item 10 where one or more surfaces of the microchannel allows for inspection inside the channel.

An example of a further embodiment, which can be referred to as item 14, is the apparatus of item 10 that further comprises at least a sensor to capture information regarding the deflection of particles by the electrodes through at least one of the one or more inspecting surfaces, where information from the sensor is processed by a computing device.

An example of a further embodiment, which can be referred to as item 15, is the apparatus of item 14 where the sensor is an imaging device and the inspecting surface is transparent to at least the imaging device.

An example of a further embodiment, which can be referred to as item 16, is the apparatus of item 14 that further comprises at least one device with simulation software connected to the computing device extracting the speed information; and at least one speed model benchmarking module to calibrate and improve physical models of the speed of the particles in the microchannel.

An example of a further embodiment, which can be referred to as item 17, is the apparatus of item 14 that further comprises at least one feedback route to apply voltage adjustments to the electrodes near or in the micro channel.

An example of a further embodiment, which can be referred to as item 18, is the apparatus of item 12, that further comprises at least one indentation on the channel wall aligned with the electrodes to retain at least one deflected particle.

An example of a further embodiment, which can be referred to as item 19, is the apparatus of item 18, where the channel wall indentation contains at least one measurement instrument which can measure at least one parameter concerning the at least one deflected particle.

An example of a further embodiment, which can be referred to as item 20, is the apparatus of item 11, further comprising at least one processor; and at least one memory including computer program code, wherein the at least one processor, in response to execution of the computer program code, is configured to cause the apparatus to control or perform at least applying a fluid into a microchannel at a location, wherein the fluid contains suspended particles, and wherein the fluid flows within the microchannel in a direction away from the location; generating a modulated electric field in the fluid by applying a voltage to electrodes near or within the microchannel; based on a configuration of the electrodes, deflecting the particles; and based on the deflection of the particles, determining the speed of the particles.

In another example of an embodiment of the current invention, which can be referred to item 21, is a computer program product embodied on a non-transitory computer-readable medium in which a computer program is stored that, when being executed by a computer, would be configured to provide instructions to control or carry out applying a fluid into a microchannel at a location, wherein the fluid contains suspended particles, and wherein the fluid flows within the microchannel in a direction away from the location; generating a modulated electric field in the fluid by applying a voltage to electrodes near or within the microchannel; based on a configuration of the electrodes, deflecting the particles; and based on the deflection of the particles, determining the speed of the particles.

In another example of an embodiment of the current invention, which can be referred to as item 22, is a system comprising a micro fluidic device with a microchannel wherein a fluid flows in a direction away from a location it is applied, wherein the fluid contains suspended particles and wherein one or more surfaces of the microchannel is transparent to inspection of inside the microchannel; the device further comprising electrodes generating a modulated electric field within the fluid by applying a voltage, wherein the electrodes are configured to deflect the particles flowing with the fluid; an image sensing device to capture the deflection of particles by the electrodes through at least one of the one or more inspection surfaces, wherein the image sensing device is connected to a computing device with processing software to extract speed information based on the deflection of the particles; and at least one feedback route to apply voltage adjustments to the electrodes.

In another example of an embodiment of the current invention, which can be referred to as item 23, is an apparatus with means for a fluid to flow in a microchannel direction away from the fluid's application site, where the fluid contains suspended particles and the microchannel's interior can be monitored; means for generating a modulated electric field within the fluid, configured to deflect the particles flowing with the fluid; means to record or use the deflection of particles or information about the deflection of the particles by means of the monitoring by means of a computing device with processing software to extract speed information based on the deflection of the particles; and means to adjust the modulated electric field.

It is also noted herein that while the above describes examples of embodiments of the invention, these descriptions should not be viewed in a limiting sense. Rather, there are several variations and modifications which may be made without departing from the scope of the present invention as defined in the appended claims.

What is claimed is:

1. A microfluidic device comprising:
a substrate with a microchannel with a location where fluid can be applied, wherein the fluid flows in a direction away from the location, and wherein the fluid contains suspended particles;
a voltage generator for applying a voltage to a plurality of electrodes of the microfluidic device, wherein the plurality of electrodes of the microfluidic device are arranged with increasingly narrower gaps in the direction of the flow of the fluid at a rate, the rate being such that a second gap width difference between a second group of two adjacent electrodes of the plurality of electrodes of the microfluidic device is determined by adding a value to a first gap width difference between a first group of two adjacent electrodes of the plurality of electrodes of the microfluidic device, wherein the first group and second group either share a common electrode or do not share a common electrode;
wherein the plurality of electrodes of the microfluidic device are configured to generate a modulated electric field within the fluid in response to the applied voltage, wherein the plurality of electrodes of the microfluidic device are configured to deflect the particles flowing with the fluid according to a particle velocity;
a sensor configured to capture information regarding the deflection of the particles by the plurality of electrodes of the microfluidic device through at least one of one or more inspecting surfaces, wherein the information comprises a speed of the particles determined based on the deflection of the particles; and
a computing device coupled to the sensor, the computing device comprising a non-transitory computer readable medium comprising instructions;
wherein the computing device is configured to:
during a real-time analysis of the deflection of the particles:
measure relative variations of flow speed of the deflection of the particles; and
provide voltage adjustments to the plurality of electrodes of the microfluidic device, based on the measured relative variations of the flow speed, in a feedback loop; and
during an offline analysis of the deflection of the particles:
calibrate at least one unknown parameter of a computational simulation model, wherein the at least one unknown parameter comprises the flow speed of the deflection of the particles in the microchannel; and
determine, for a future design of at least one other microfluidic device, a value added to a first gap width difference between a first group of two adjacent electrodes of a plurality of electrodes of the at least one other microfluidic device, to obtain a second gap width difference between a second group of two adjacent electrodes of the plurality of electrodes of the at least one other microfluidic device, based on the calibrated at least one unknown parameter comprising the flow speed of the deflection of the particles in the microchannel;
wherein the offline analysis comprises turning off an imaging device comprising the sensor and the voltage generator for providing the voltage adjustments.

2. The microfluidic device of claim 1, wherein the voltage applied to the plurality of electrodes of the microfluidic device generates an electric field distribution inside the fluid inducing particle deflecting forces that gradually increase along the microchannel covered by the plurality of electrodes of the microfluidic device.

3. The microfluidic device of claim 1, wherein the plurality of electrodes of the microfluidic device are made of patterned planar conducting materials integrated in the microchannel.

4. The microfluidic device of claim 3, further comprising:
at least one indentation on a microchannel wall aligned with the plurality of electrodes of the microfluidic device to retain at least one deflected particle.

5. The microfluidic device of claim 4, wherein the at least one indentation on the microchannel wall contains at least one measurement instrument which can measure at least one parameter concerning the at least one deflected particle.

6. The microfluidic device of claim 1, wherein the one or more inspecting surfaces of the microchannel is configured for inspection inside the microchannel.

7. The microfluidic device of claim 1, wherein the sensor is an imaging device and the at least one of the one or more inspecting surfaces is transparent to at least the imaging device.

8. The microfluidic device of claim 1,
wherein the instructions of the non-transitory computer readable medium further comprise:
speed characterization software configured to extract the information comprising the speed of the particles;
speed model benchmarking software configured to provide at least one feedback route, wherein the at least one feedback route is used to implement the feedback loop of providing the voltage adjustments to the plurality of electrodes of the microfluidic device based on the measured relative variations of the flow speed; and
simulation software configured to provide a graphical user interface.

9. The microfluidic device of claim 1, further comprising:
at least one feedback route to apply the voltage adjustments to the plurality of electrodes of the microfluidic device near or in the microchannel.

10. The microfluidic device of claim 1, wherein the plurality of electrodes of the microfluidic device are arranged in pairs along the microchannel such that the first group and the second group of the two adjacent electrodes of the plurality of electrodes of the microfluidic device do not share a common electrode, each pair separated by a distance, wherein a gap width between the plurality of electrodes of the microfluidic device of each pair is narrowed in the direction of the flow of the fluid at the rate.

11. The microfluidic device of claim 1, wherein the computing device, during the real-time analysis of the deflection of the particles, is further configured to:
extract an absolute speed of the particles based on the speed of the particles determined based on the deflection of the particles; and
provide the voltage adjustments to the plurality of electrodes of the microfluidic device, based on the extracted absolute speed of the particles, in the feedback loop.

12. A system comprising:
a microfluidic device with a microchannel wherein a fluid flows in a direction away from a location it is applied, wherein the fluid contains suspended particles and wherein one or more surfaces of the microchannel is transparent to inspection of inside the microchannel;
the microfluidic device further comprising a voltage generator for applying a voltage to a plurality of electrodes of the microfluidic device, wherein the plurality of electrodes of the microfluidic device are arranged with increasingly narrower gaps in the direction of the flow of the fluid at a rate, the rate being such that a second gap width difference between a second group of two adjacent electrodes of the plurality of electrodes of the microfluidic device is determined by adding a value to a first gap width difference between a first group of two adjacent electrodes of the plurality of electrodes of the microfluidic device, wherein the first group and the second group either share a common electrode or do not share a common electrode;
wherein the plurality of electrodes of the microfluidic device are configured to generate a modulated electric field within the fluid in response to the applied voltage, wherein the plurality of electrodes of the microfluidic device are configured to deflect the particles flowing with the fluid;
an image sensing device configured to capture information regarding the deflection of the particles by the plurality of electrodes of the microfluidic device through at least one of one or more inspection surfaces; and
a computing device coupled to the image sensing device, the computing device comprising a non-transitory computer readable medium comprising instructions, the instructions comprising:
speed characterization software configured to extract speed information based on the deflection of the particles;
wherein the computing device is configured to:
during a real-time analysis of the deflection of the particles:
measure relative variations of flow speed of the deflection of the particles; and
provide voltage adjustments to the plurality of electrodes of the microfluidic device, based on the measured relative variations of the flow speed, in a feedback loop; and
during an offline analysis of the deflection of the particles:
calibrate at least one unknown parameter of a computational simulation model, wherein the at least one unknown parameter comprises the flow speed of the deflection of the particles in the microchannel; and
determine, for a future design of at least one other microfluidic device, a value added to a first gap width difference between a first group of two adjacent electrodes of a plurality of electrodes of the at least one other microfluidic device, to obtain a second gap width difference between a second group of two adjacent electrodes of the plurality of electrodes of the at least one other microfluidic device, based on the calibrated at least one unknown parameter comprising the flow speed of the deflection of the particles in the microchannel;
wherein the offline analysis comprises turning off an imaging device comprising a sensor and the voltage generator for providing the voltage adjustments.

* * * * *